United States Patent Office 3,015,930
Patented Jan. 9, 1962

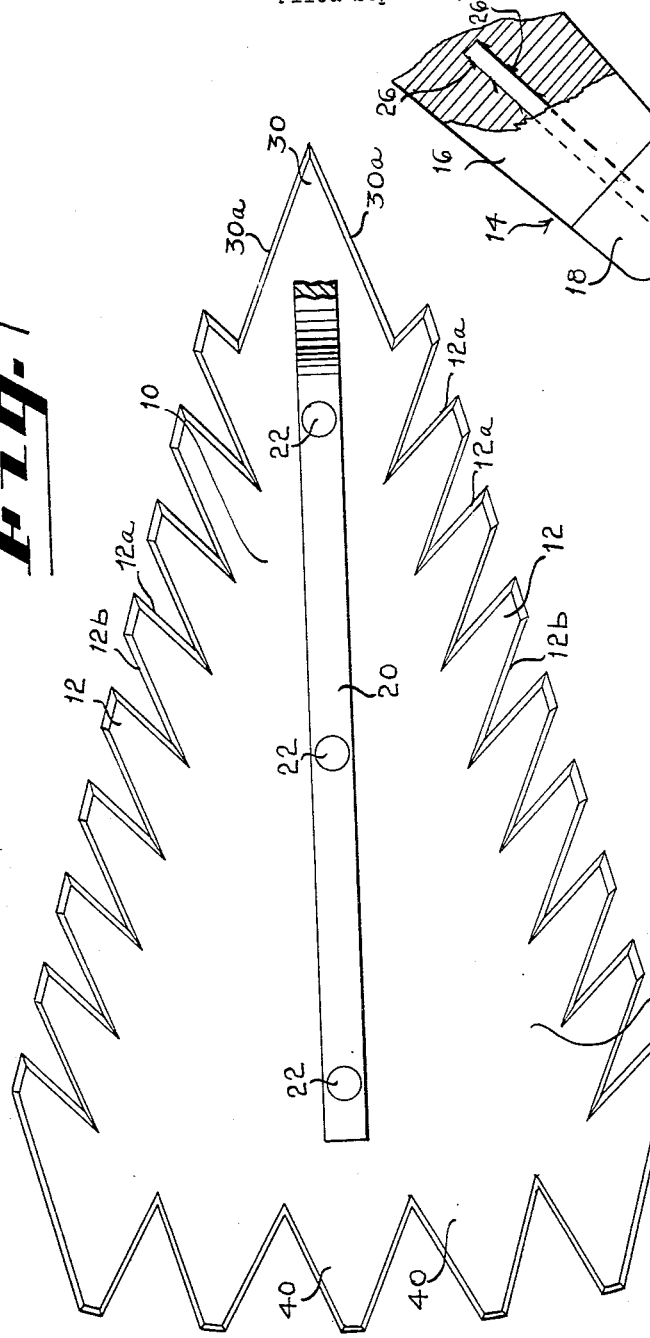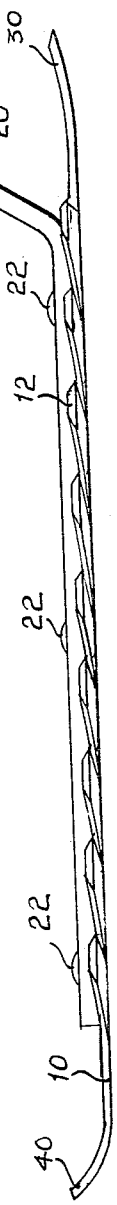

---

3,015,930
SAW SICKLE
Lester H. Campbell, 6951 Post Town Road, Dayton, Ohio
Filed Sept. 30, 1960, Ser. No. 59,737
3 Claims. (Cl. 56—239)

This invention relates to a device for cutting vegetation, which device may be referred to as a saw sickle.

Numerous cutting devices have been developed for cutting vegetation, such as mowers, reapers, combines, sickles, scythes and numerous other devices. All of these devices have certain limitations. For example, along a ditch on the side of a highway, it is, at times, quite difficult to cut all of the vegetation by means of a scythe or a sickle, especially if the vegetation is tough and hard to sever. Furthermore, in the event the contour of the ditch is irregular, it is aggravated. In the past, cutters have been made that are pushed away from the person handling the cutter. For example, the patent to Springstead No. 96,740 discloses a cutter that is pushed away from the person cutting the grass. It is quite difficult to push a triangular-shaped cutter when the point is directed away from the person, in that the point tends to gouge into the ground.

An object of this invention is to provide a cutter having some of the characteristics of a sickle combined with characteristics of a saw, which cutter is pulled toward the person cutting the vegetation. This has been accomplished by providing a substantially triangular-shaped main body portion having teeth simulating saw teeth, the angle of which has been so arranged that as the cutter is drawn toward the person cutting the vegetation, the teeth hook the vegetation to thereby cut it.

Another object of this invention is to provide a cutting device having some of the characteristics of a sickle and other characteristics of a saw, wherein the extremities of the teeth are deflected upwardly slightly from the main body of the blade, so as to deter the teeth of the cutter from gouging into the ground as the main body of the cutter is drawn through the vegetation.

Another object of this invention is to provide a cutter having some of the characteristics of a sickle and other characteristics similar to those of a saw, wherein teeth project laterally from a triangular main body portion secured to a handle directed rearwardly from the apex of the main body portion and wherein the base of the triangular portion is provided with tine-like members that tend to lay the cut vegetation in a direction opposite to the direction in which the blade is pulled through the vegetation.

Other objects and advantages reside in the construction of parts, the combination thereof, the method of manufacture and the mode of operation, as will become more apparent from the following description.

In the drawings,

FIGURE 1 is a top plan view of a cutter blade with the handle broken away.

FIGURE 2 is a side elevational view of the cutter blade with parts shown in section and other parts broken away.

Referring to the drawings, a main body portion 10 of the cutter blade is substantially triangular in shape. Cutting teeth 12 project laterally from the main body. A handle assembly 14 includes a wood handle portion 16, preferably provided with a ferrule 18 and having inserted therein a bar 20 riveted at 22 to the blade 10. The horizontal portion of the bar 20 lies over the blade portion to reinforce the same. The tapered end of the main body 10 is referred to as the rear end.

Tooth-like projections 26 are located on the portion of the bar 20 that projects into an aperture in the lower end of the handle, so as to secure the bar 20 permanently to the handle. The handle may have a length similar to the handle of a conventional rake or the handle of a fork. The outer ends of the teeth 12 project upwardly, again, for the purpose of deterring the teeth from gouging into the ground. The outer ends of the teeth 12 may be raised through a distance at least equal to the thickness of the main body portion. The teeth 12 simulate saw teeth, in that the edges 12a are inclined away from the main body portion toward the rear or toward the apex of the triangular body portion, so that as the blade is pulled through vegetation, the edges 12a cut the grass similar to a sickle. The edges 12b of the blades are sharpened; but, as the blade is pushed away from the operator, the edges 12b are each shielded by a tooth directly ahead thereof.

The rear end 30 of the blade 10 is pointed and deflected upwardly, so that as the cutter blade is pulled toward the operator, the triangular rear end portion 30 will not tend to gouge into the ground. The edges 30a of the triangular portion 30 have been sharpened, so as to present a sharp edge for cutting the vegetation.

It is quite desirable that the vegetation which is cut as the blade is pulled through the vegetation be laid down in a direction opposite from the movement of the blade. A plurality of tine-like members 40 are mounted at the base of the triangular body portion and project upwardly, so as to engage the lower portion of the cut vegetation, to thereby cause the vegetation to drop away from the operator pulling the cutter toward him. Furthermore, the tines 40 may be used as a rake by merely turning the cutter upside down, in which event the tines 40 will be directed downwardly and can be used to rake together the cut vegetation.

This cutter has been found to be very efficient in trimming the edges along sidewalks, driveways and for cutting grass under fences. In use, the cutter is preferably actuated by short, snappy strokes directed toward the person using the cutter. That is, the person pulls the cutter toward himself during the cutting stroke. Either one or both sides of the cutter are used when cutting vegetation. The main body of the cutter, so to speak, glides on the ground or the supporting surface when in use.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A saw sickle for cutting vegetation such as grain, grass, weeds and brush, said saw sickle including a blade and a handle attached thereto, said blade having a substantially triangular main body portion, the handle projecting rearwardly from near the apex of the main body portion, said body portion having laterally projecting teeth simulating saw teeth slanted toward the rear, the forward and rear edges of the teeth being sharpened so that as the blade is pulled through vegetation by the handle the blades hook and cut the vegetation, said teeth having the outer ends deflected upwardly through a distance at least equal to the thickness of the main body portion.

2. A saw sickle according to claim 1, wherein the apex of the main body portion terminates in a triangular portion having the sides thereof sharpened to cut vegetation.

3. A saw sickle for cutting vegetation such as grain, grass, weeds and brush, said saw sickle including a main blade portion and a handle attached thereto, said main blade portion having a substantially triangular body portion, the handle projecting rearwardly from near the apex of the main body portion, said body portion having teeth simulating saw teeth projecting laterally from the sides of the main body portion, the outer portions of the teeth being directed upwardly a distance at least equal to the thickness of the main body portion, the apex of the main body portion terminating in a triangular portion, the sides of the teeth and the sides of the triangular portion being sharpened so as to cut vegetation, and upwardly directed tines projecting from the base of the triangular main body portion, said tines engaging the cut ends of the vegetation and moving them to a limited extent so as to lay the cut vegetation downwardly in a direction opposite to the cutting movement of the saw sickle.

References Cited in the file of this patent

UNITED STATES PATENTS

| | | |
|---|---|---|
| 917,670 | Shanks | Apr. 6, 1909 |
| 1,679,806 | Bockstadter | Aug. 7, 1928 |
| 2,169,557 | Curtiss | Aug. 15, 1939 |
| 2,184,968 | Woodruff | Dec. 26, 1939 |
| 2,251,048 | Garland | July 29, 1941 |